United States Patent
Lemeur et al.

(10) Patent No.: US 7,047,049 B2
(45) Date of Patent: May 16, 2006

(54) RADIO COMMUNICATIONS DEVICE INCLUDING AT LEAST ONE LIGHT SOURCE

(75) Inventors: Philippe M. Lemeur, Concarneau (FR); Ludovic M. Robichon, Saint Christophe des Bois (FR)

(73) Assignee: Wavecom, Issy-les-Moulineaux (FR)

( * ) Notice: Subject to any disclaimer, the term of this patent is extended or adjusted under 35 U.S.C. 154(b) by 101 days.

(21) Appl. No.: 10/881,953

(22) Filed: Jun. 30, 2004

(65) Prior Publication Data

US 2005/0113148 A1    May 26, 2005

(30) Foreign Application Priority Data

Jun. 30, 2003   (FR)   ................... 03 07926

(51) Int. Cl.
| | |
|---|---|
| H04B 1/30 | (2006.01) |
| H04B 1/16 | (2006.01) |
| H04M 1/00 | (2006.01) |
| H01Q 11/12 | (2006.01) |
| H04Q 1/30 | (2006.01) |

(52) U.S. Cl. ................ 455/567; 455/574; 455/566; 455/550.1; 455/343.1; 455/127.5; 340/7.61

(58) Field of Classification Search .. 455/343.1–343.2, 455/343.5, 127.1, 127.5, 418, 421, 412.2, 455/401, 566, 550.1, 567, 574, 159.1, 159.2; 370/164, 263, 376.01, 396; 340/7.61, 815.45; 362/611, 612, 613

See application file for complete search history.

(56) References Cited

U.S. PATENT DOCUMENTS

| | | | | |
|---|---|---|---|---|
| 5,708,970 | A | * | 1/1998 | Newman et al. ........... 455/35.1 |
| 6,115,619 | A | * | 9/2000 | Cho .......................... 455/566 |
| 6,411,198 | B1 | * | 6/2002 | Hirai et al. .................. 340/7.6 |
| 6,850,776 | B1 | * | 2/2005 | Sandelius et al. ........... 455/557 |

FOREIGN PATENT DOCUMENTS

| | | |
|---|---|---|
| EP | 1 033 903 A2 | 6/2000 |
| EP | 1 276 300 A2 * | 1/2003 |
| GB | 2 355 894 | 2/2001 |

* cited by examiner

Primary Examiner—William Trost
Assistant Examiner—Meless Zewdu
(74) Attorney, Agent, or Firm—Westman, Champlin & Kelly

(57) ABSTRACT

An embodiment of the invention relates to a radio communications device that includes at least one light source to indicate at least two distinct statuses of the device and whose luminosity varies according to different rhythms based on these statuses. In at least one initial status, the light source is controlled by a noticeably periodic digital signal that powers the integration means connected to it.

16 Claims, 7 Drawing Sheets

RADIO COMMUNICATIONS DEVICE INCLUDING AT LEAST ONE LIGHT SOURCE

FIELD OF THE INVENTION

This invention relates to the field of radio communications, in particular mobile communication terminals and radiotelephones—for example GSM (Global System for Mobile communication) or UMTS (Universal Mobile Telecommunication System)-type systems.

More specifically, the invention relates to an indication of the idle status of the terminal equipment (in particular, in idle or active) in a visual form of this indication.

BACKGROUND OF THE INVENTION

According to the state of the art, blinking diodes already exist on radiotelephones, which blink to indicate that they are in operating mode. A disadvantage of previous techniques is that they do not allow varying the rhythm of the blinking.

Therefore, the diode must be supplied with energy regularly and periodically to provide the blinking rhythm.

SUMMARY OF THE INVENTION

In particular, the purpose of the invention, according to its various aspects, is to offset the disadvantages of the prior art.

More specifically, one objective of the invention is to provide an efficient and ergonomic visual restoration technique of a representative information element of the status of a radio communications device.

Another objective of the invention is to provide such a technique requiring a reduced consumption and in particular not requiring the use of PWM (Pulse Width Modulation), and more generally, systems requiring power.

An objective of the invention is to thus significantly increase the autonomy of terminal equipments equipped with a light status indicator.

Another objective of the invention is to allow a variable display with, in particular, an intensity that allows slowly increasing and/or decreasing, this variable display being especially flexible and relatively simple to implement.

For this purpose, the invention suggests a radio communications device that includes at least one light source to indicate at least two different statuses of the device and whose luminosity varies according to various rhythms depending on the statuses, notable in that, in at least one of the statuses, the light source is controlled by a noticeably periodic digital signal providing power to an integrator connected to the light source.

In particular, a radio communications device here is a mobile telecommunication terminal (for example UMTS or GSM), a wireless telephone terminal (DECT, in particular), a PDA (Personal Digital Assistant)-type terminal, or a component (in particular, an integrated circuit or an electronic chip) or an electronic card designed to equip such terminal equipments.

According to one particular characteristic, the radio communications device is notable in that the first status is an idle status requiring little power consumption.

Thus, the invention allows extensive autonomy by reducing power consumption, in particular, when the device is not in communication mode.

According to a specific characteristic, the radio communications device is notable in that the noticeably periodic digital signal is a square wave signal.

According to a specific characteristic, the radio communications device is notable in that the digital signal changes value each time an alarm associated with a process performed during the idle mode is activated.

According to a particular characteristic, the radio communications device is notable in that the alarm is associated with a "paging" signal received by the device, when it is in idle mode.

Thus, the regular digital signal uses an available resource ("paging" signal regularly transmitted by a base station to the terminal equipments present in its cell) and changes value optimally, when the device (even if in idle mode) processes an outside signal during short periods, the synchronisation of the "paging" alarm and the digital signal contributes to the saving of energy.

Furthermore, the paging signal is different from one cell to another, and the user can thus easily identify a change of cells.

According to a particular characteristic, the radio communications device is notable in that the integrator includes at least one resistance and at least one capacitance that form an integrator.

Thus, the integrator is relatively easy to implement and can be adapted to the desired lighting characteristics (in particular, intensity variation).

According to a particular characteristic, the radio communications device is notable in that the integrator includes two parallel-mounted circuits each including at least one resistance and at least one diode. The diodes are mounted in opposite directions inside the circuits. The circuits and at least one capacitor form an integrator.

Thus, both the load and the unload of the condenser, and therefore the increase and decrease of the light intensity (in particular their variation and duration), are controlled.

According to a particular characteristic, the radio communications device is notable in that the period of the digital signal is greater than or equal to two seconds.

Thus, the user can easily associate the brightness of the varying light source at a relatively slow rhythm, to the first status.

Furthermore, the light intensity variation is controlled.

According to a particular characteristic, the radio communications device is notable in that the integrator provides power to a converter of a tension voltage to a current, which supplies power to the light source.

Thus, the consumption of the integrator is particularly low.

According to a particular characteristic, the radio communications device is notable in that a field-effect transistor and a related resistance form the converter.

According to a particular characteristic, the radio communications device is notable in that the light sources include at least one light emitting diode.

According to a particular characteristic, the radio communications device is notable in that, in at least a second status, the source is controlled using pulse width modulation (PWM).

Thus, in a second status, the light source is controlled by a non-regular signal, which allows correctly distinguishing the various statuses.

According to a particular characteristic, the radio communications device is notable in that the regular digital signal and a signal for the pulse width modulation are multiplexed over the same input.

Furthermore, the invention thus allows optimising the pin layout between the various circuits by multiplexing the signals generated in idle mode and in active mode (PWM.) According to a particular characteristic, the radio communications device is notable in that when the system passes into a status wherein the integrator is not used, the integrator is isolated from the ground connection using a transistor.

According to a particular characteristic, the radio communications device is notable in that it includes at least two integrators that can be used selectively, and/or a programmable integrator, so as to modify the light variation rhythm.

Other characteristics and advantages of the invention will become clearer upon reading the following description of a preferential embodiment, provided as a simple and non-limiting illustrative example, as well as the attached drawings.

DETAILED DESCRIPTION OF THE PREFERRED EMBODIMENTS

The general principle of one embodiment of the present invention is based on the use, in an idle mode of a radio communications device, of a regular command signal of a digital light source. The command signal powers an integrator (for example, based on a capacitive circuit and/or a transistor). Preferably, the command signal comes from a signal processed by the terminal equipment during idle mode. Thus, when the device has to process such a signal (for example, a "paging" signal), the electronic circuits are activated during a relatively short period of time and allow changing the command signal value while consuming very little energy.

Figure 1:
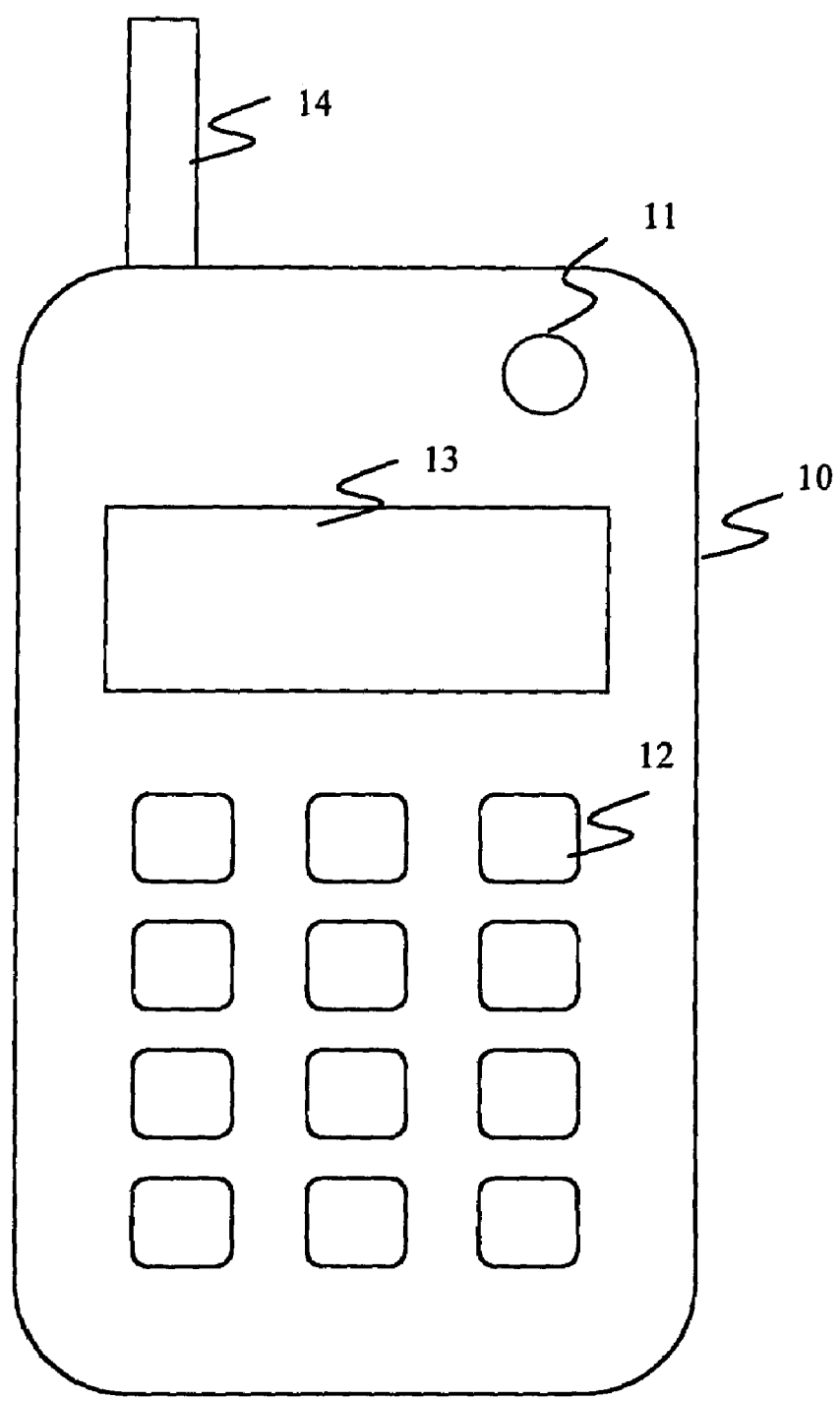
FIG. 1 presents a radio communications terminal according to one embodiment of the invention.

Presented, with respect to FIG. 1, is a radio communications terminal 10 according to a specific embodiment of the invention.

Terminal equipment 10 is, for example, a GSM, DECT, UMTS-type terminal, and more generally, of the type that operates with a battery and that has at least two operating modes (in particular, an idle mode and an active or communication mode(s)).

Terminal equipment 10 includes in particular:
a chassis
a light emitting diode or LED 11
a keypad 12
a screen 13
an antenna 14
reception and transmission elements
radio communications signal processing elements
elements for controlling diode 11
a battery with Vbatt tension (voltage) of some volts (preferably between 3 and 4.5V) at its terminals.

According to one embodiment of the invention, when terminal equipment 10 is in the communication mode, diode 11 lights up according to a rhythm that is relatively fast and/or with sustained intensity.

On the other hand, when terminal equipment 10 is in the idle mode, diode 11 lights up according to a slower rhythm (for example, with a frequency that varies from 0.5 to 2 seconds) and/or by slowly varying the intensity between two extreme values.

Preferably, LED 11 and its control elements are powered by the Vbatt tension taken directly from the battery. According to a variant of the invention, the terminal equipment includes elements for adjusting and stabilising this tension voltage by providing, for example, a VCC tension voltage of approximately 2.8V powering LED 11 and its control elements.

Figure 2:
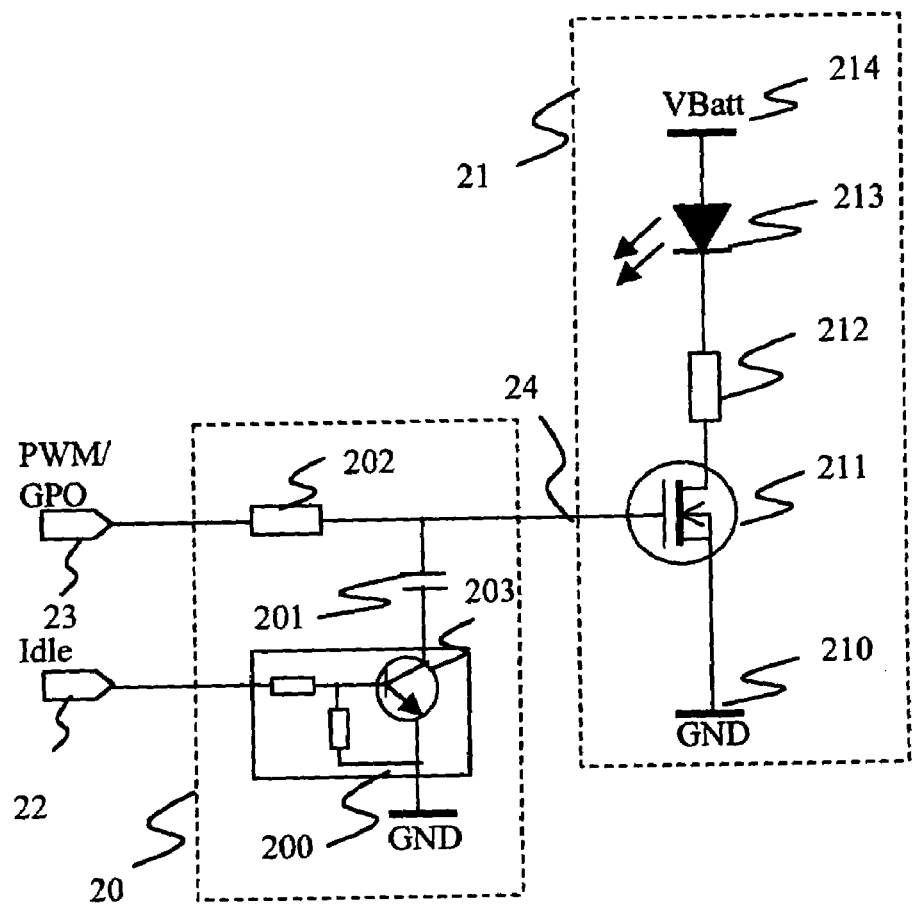
FIG. 2 illustrates schematically an electronic circuit implemented in the terminal equipment shown in FIG. 1.

FIG. 2 presents control elements of diode 11 implemented electronically in terminal equipment 10.

The control elements of diode 11 include, in particular:
an integrator 20; and
a unit 21 attached to a light emitting diode or LED 213.

Integrator 20 accepts on input a PWM-GPO signal 23 and an Idle signal 22, presents on output a signal 24, and includes the following:
an electrical resistance 202 of 300 kΩ connected to signals 23 and 24.
an inverter DTC144-type component 200 essentially comprising a transistor 203 and two resistances and whose input is connected to Idle signal 22, a terminal related to a transmitter of the transistor is connected to the ground connection and the other terminal (transistor transmitter), corresponding to the output of the component, presents the signal 22 in inverted form; and
a 2.2 µF condenser (capacitor) 201 in which one of the terminals is connected to the signal 24 and the other terminal is connected to the output of component 200.

The PWM-GPO signal 23 is generated by a component responsible for transmitting and receiving a GSM-type radio signal and processing this signal. This component has GPO (General Purpose Output, allowing the generation of any digital signal) and PWM (generating a pulse modulation type command signal) ports with a GPO/PWM output that multiplexes the two signals according to a software command internal to the component and that allows presenting, on this output (and therefore on input 23 of the integrator 20) either a controlled digital signal (GPO) or a PWM signal.

Unit 21 is powered by the Vbatt electric tension voltage 214 supplied by the battery of terminal equipment 10 and includes:
the LED 213
a 270 kΩ electrical resistance 212
a field-effect transistor 211 or FET (for example of the NMOS type with reference TN0205® distributed by the company VISHAY® (an FET NMOS is controlled by a high-level tension)).

LED 213 is linked to one of its terminals to the Vbatt tension and to the other of its terminals to the resistance 212 that, itself, is connected to transistor 211 drain.

The gate and source of transistor 211 are respectively linked to signal 24 and the ground connection.

Thus, transistor 211 and resistance 212 form a circuit element for converting the tension voltage corresponding to signal 24 into a current that poweres LED 213.

When the terminal equipment is in communication mode, signal 22 is linked to the ground connection and the PWM-GPO signal 23 receives a signal according to PWM (Pulse Width Modulation). PWM is based on a varying signal amplitude generated according to the pulse widths of a command signal at two PWM-type statuses that allows controlling the frequency and luminosity of LED 213.

In contrast, when the terminal equipment is in idle mode, signal 22 corresponds to the Vbatt electric tension voltage and transistor 203 is saturated. The PWM-GPO signal 23 is a square wave type signal. In this case, the intensity of the LED is controlled by a signal that is noticeably triangular and that corresponds to the integration of the PWM-GPO signal and controls transistor 211.

This circuitry as illustrated in FIG. 2 allows limiting the energy consumption related to LED 213, in particular in idle mode.

Figure 3:
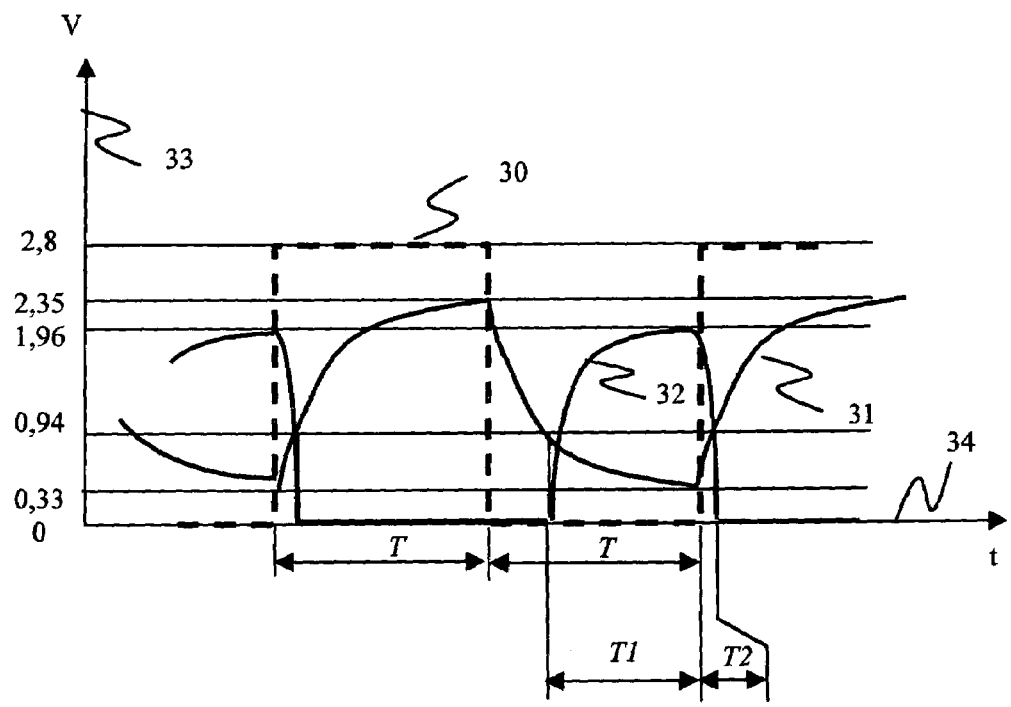
FIGS. 3 and 4 describe the amplitude of the signals implemented in the terminal equipment according to FIG. 1.

FIG. 3 illustrates signal amplitudes 33 present in the circuit in FIG. 2 according to time 34 when signal 22 is linked to the Vbatt tension.

More specifically, curves 30, 31, and 32 illustrate respectively the amplitudes of signals 23, 24 and of the command signal of LED 213 when terminal equipment 10 is in idle mode.

Signal 23 represented by curve 30 is a periodic square wave signal that presents, at each period, a null tension during a time T equal to 2.3 s and a tension equal to 2.8V during the same period T. Signal 23 is generated by a specific software program or part of a software program operating in the terminal equipment in idle mode and using a slow clock, normally rated at 32 KHz. Thus, no high frequency clock signal (in particular 13 MHz) is used, which allows consuming relatively low levels of energy. Furthermore, the frequency and form of the command signals can be easily adjusted and/or programmed.

According to a variation of the invention, in idle mode, signal 23 is generated from a synchronisation signal transmitted by the network (paging burst) that is normally detected by terminal equipment 10. Signal 23 changes status each time it receives a paging burst. The paging signals are transmitted in an unsynchronised manner and at a different frequency from one cell to another. The LED blinks differently at the passage from one cell to another, and the user can beneficially note the cell change of terminal equipment 10. Furthermore, if terminal equipment 10 does not perceive the paging signal during a relatively long period of time, terminal equipment 10 not being in an area that allows correctly receiving this signal, the LED will be placed in an off status. Thus, this allows saving energy and indicating simply and ergonomically to the user that terminal equipment 10 cannot receive or transmit communication.

Signal 23 is integrated by integrator 20 (and more specifically, resistance 202 and capacitor 201) to provide signal 24 represented by curve 31. At each period, during a time T, signal 31, which is synchronous to signal 30, progressively increases from a low value equal to 0.33 mV to a high value equal to 2.35, and then progressively decreases during the same time T from the high value to the low value.

The command signal of LED 213 represented by curve 32 corresponds to the difference in potential to FET transistor terminals 211.

In established idle mode, at the start of each time period corresponding to a passage to a high level of signal 30, LED 213 is deactivated and tension 32 at the FET terminals is maximum and equals 1.96V. When signal 30 passes to 2.8V, tension 32 drops relatively quickly to approximately 0V, signal 31 being at a low level between 0.33 and 0.94V. When signal 31 is at a level greater than 0.94V, LED 213 lights up. Then in the second half of a period, when signal 31 decreases and becomes lower than 0.94V, signal 32 progressively increases until it reaches a tension equal to 1.96V, corresponding to the minimal light intensity of LED 213.

The variation of signal 31 is relatively strong at around 0.94V. Thus, the lighting of LED 213 is not very sensitive to the uncertainties on the threshold, belonging to each field-effect transistor 211. This allows facilitating a uniform manufacturing of terminal equipments; each terminal equipment having, in idle mode, a LED that notably lights up in the same manner, all being equal elsewhere.

Thus, during a slightly longer period than period T, LED 213 remains lit. Then, its light intensity is reduced progressively before increasing relatively quickly. This way, LED 213 blinks slowly with a period equal to 2T, that is 4.6 s and the user of terminal equipment 10 perceives the idle mode in a very ergonomic manner.

Of course, according to the variants of the embodiment, the values of resistance 202 and of condenser 203 of the integrator can be modified to vary the increasing and decreasing speeds of the tension at the terminals of FET 211, and therefore to modify the variations (in duration and intensity) of LED 213.

Figure 4:
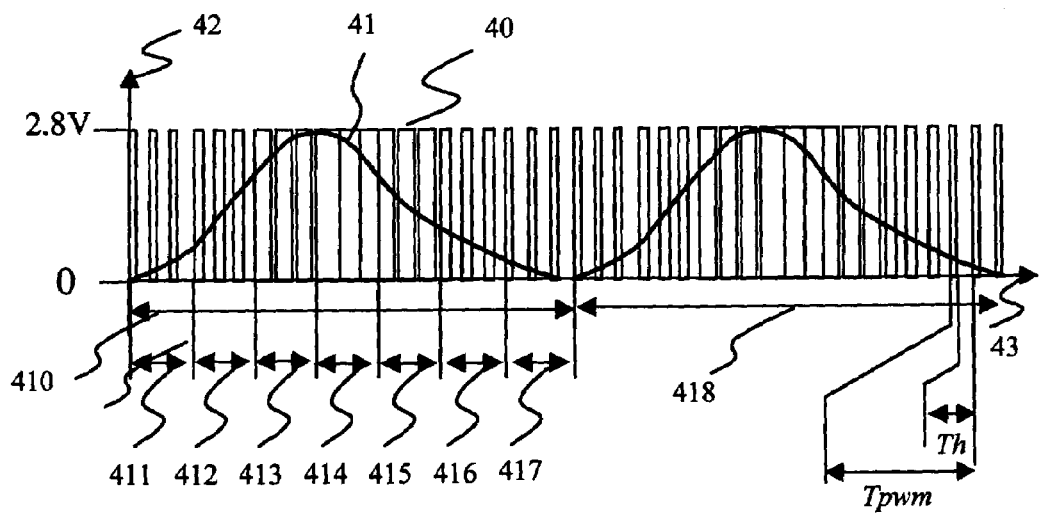

FIG. 4 illustrates amplitude 42 of the signal that controls LED 213 associated with a PWM-type command 40 in communication mode according to time 33 (that is, when signal 22 is linked to the ground connection).

Amplitude 42 of signal 41 that controls LED 213 and that crosses resistance 212 depends directly on signal 24, here of PWM-type during a communication corresponding to signal 40 that is represented. FIG. 4 presents two cycles 410 and 418 during which LED 23 lights up then goes off progressively. Each of the cycles is divided into several stages (stages 411 to 417 for cycle 410.) During each stage, signal PWM 24 is of the square wave type and periodic: during each Tpwm width duration period, the signal is at a high level corresponding to Vbatt during a Tpwm-Th period, then at a null level during a Th period.

At the beginning of the cycle (stage 411), Th is relatively large and the amplitude of LED 213 is therefore low. Duration Th progressively increases from one stage to another to reach a maximum at stage 414 placed in the middle of cycle 410. Then, period Th decreases upon passing from one stage to another to reach a minimum at stage 417.

The lighting cycles of LED 213 are noticeably quicker in communication mode than in idle mode. Thus, thanks in particular to the lighting rhythm of LED 213, the user can easily determine the nature of the current mode (idle or communication).

Integration circuit elements 202 and 201 allow smoothing the progress and/or reduction of the intensity of LED 213. Thus, the intensity variations of the LED are slow and allow improving the perception of the mode by the user.

Variant of the LED Control Circuit Elements

Figure 5:
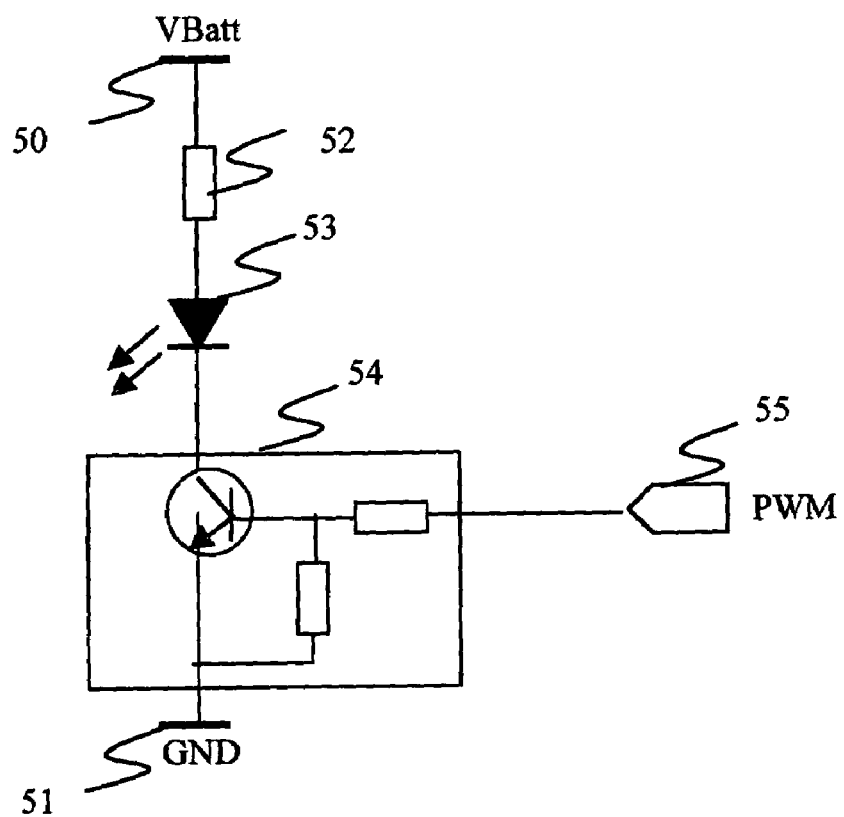
FIGS. 5, 6, and 8 provide an electronic diagram according to alternative embodiments of the present invention.

FIG. 5 illustrates an embodiment of a circuit that allows lighting a LED based on the use of PWM.

The circuit according to this figure includes:
- a 330 Ω resistance 52
- a DTC144-type inverter component 54 similar to component 200 previously illustrated
- a LED 53 linking resistance 52 to the transistor of component 54.

Component 54 and the resistance include, furthermore, a pin linked respectively to ground connection 51 and to Vbatt tension 50 supplied by a battery.

In addition, a PWM type signal 55 powers circuit 54 to control the intensity of LED 53. The shape of signal 55 is similar to that of signal 40 presented above referring to FIG. 4, the intensity of the LED itself varies according to signal 41.

The circuit illustrated referring to FIG. 5 is used in idle and/or communication mode with different width cycles for each of the modes. Nevertheless, it leads to significant consumption each time the command signal is activated (that is, every 0.5 to 2 seconds in idle mode in order to obtain satisfactory diode blinking) thus quickly using up the battery of the terminal equipment, resulting in less autonomy than the embodiments illustrated referring to FIGS. 2 and 6.

Figure 6:
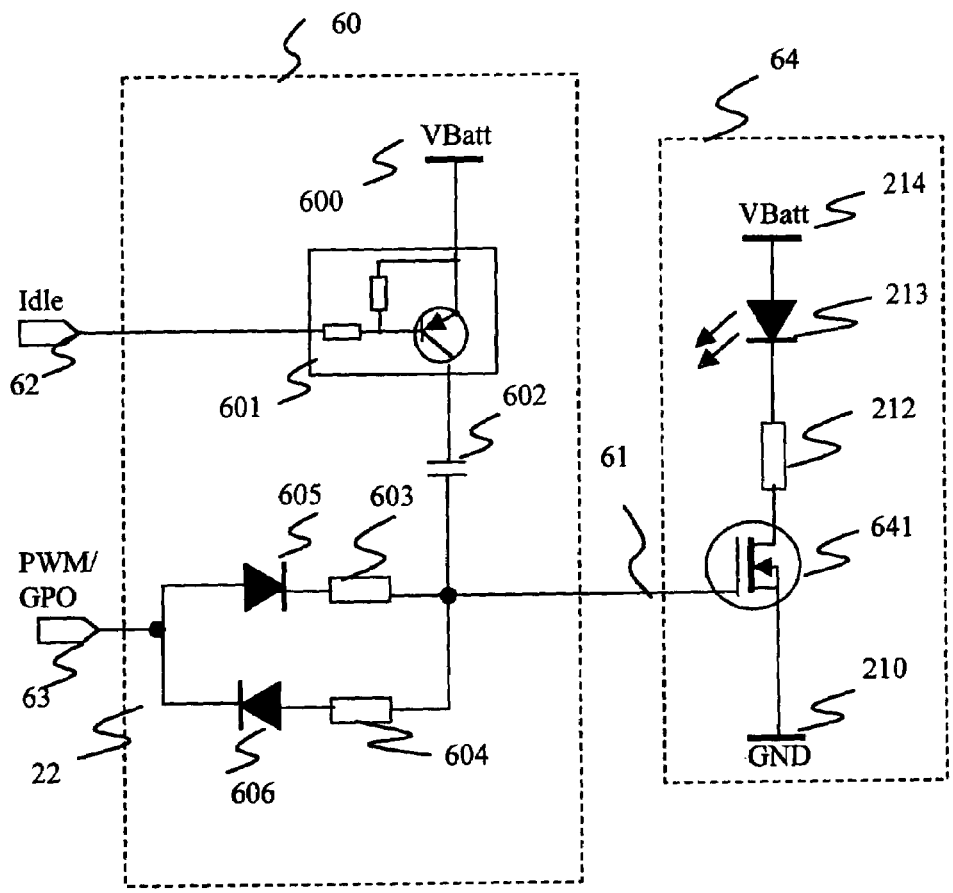

FIG. 6 presents an electronic diagram of a control circuit of a diode 213 according to a variant of the invention implemented in terminal equipment 10.

The control circuit of diode 11 includes, in particular:
an integrator 60
a unit 64 associated with a LED 213

Unit 64 is similar to unit 21 presented referring to FIG. 2 and will therefore not be described further.

Integrator 60 accepts on input control signals 62 and 63 similar to signals 22 and 23, respectively, previously illustrated in the circuit in FIG. 2, and presents an output signal 61. In particular, it includes:
- a DTA144EE-type component 601 (with a structure similar to component 200 and essentially different by the type of bipolar transistor at PNP junction in one case, and NPN in another case)
- a 2.2 µF condenser 602
- two branches each including a diode 605 and 606 respectively mounted in opposite direction and a resistance 603 and 601 respectively of 1 MΩ. Diodes 605 and 606 are linked to the PWM-type input signal 63 in communication mode and GPO in idle mode and to the corresponding resistance, which in turn is connected to condenser 602.

The first, second, and third input terminals of component 601 are respectively linked to command signal 62, to the Vbatt power supply potential supplied by the battery of the terminal equipment, and to a terminal of condenser 602. The other terminal of condenser 602 linked to resistances 603 and 604 and supplied by command signal 61 control the gate of transistor 641.

Thus, in idle mode corresponding to signal 62 linked to the ground connection, resistances 604 and 603 allow respectively controlling the load and unload of condenser 602, which thus allows supplying a signal 61 that is noticeably triangular with a period of about 5 seconds depending on the amplitude of square wave signal 63 of the same period. According to variants of the invention, the values of resistances 603 and 604 and of the capacitance of condenser 602 are adapted to other load and unload time values, and therefore the intensity increase and decrease times of LED 213.

In communication mode, signal 62 is at Vbatt potential and the PWM-type signal 63 is directly applied to the transistor 641 gate.

Integrator 60 therefore allows obtaining a square wave and periodic signal 44 that consumes little energy and that is activated by integrator 40 to allow a LED 213 intensity that slowly varies, which the user can easily associate with an idle mode and that consumes little energy.

Figure 7:
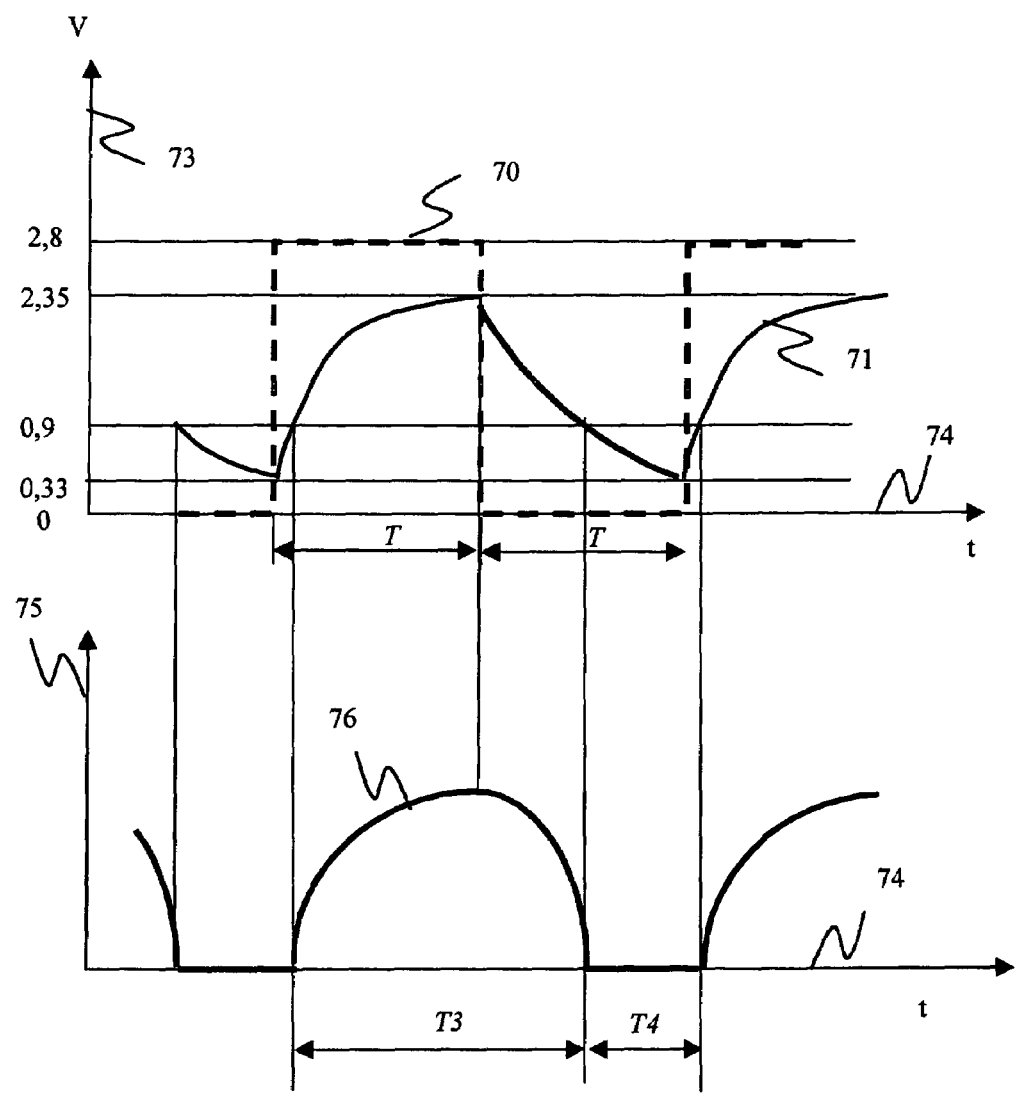
FIG. 7 illustrates signal amplitudes transported in the electronic circuit shown in FIG. 6.

FIG. 7 illustrates amplitudes 73 of signals present in the circuit in FIG. 6 according to time 74 when signal 62 is linked to a Vbatt tension.

More precisely, curves 70, 71, and 76 illustrate, respectively, the amplitudes of signals 63, 61, and the command signal of LED 213 when terminal equipment 10 is in idle mode.

Signal 63 represented by curve 70 is a periodic square wave signal with, at each period, a null tension during time T equal to 2.5 s and a tension equal to 2.8V (regulated power supply tension) during the same duration T.

Signal 63 is integrated by integrator 60 (and more precisely resistances 603 (load) and 604 (unload) and capacitor 601) to supply signal 61 represented by curve 71. At each period, of a duration 2T, signal 71 that is synchronous with signal 63 progressively increases from a low value equal to 0.33 mV to a high value of approximately 2.35V during period T, then progressively decreases during the same period T from the high value to the low value.

The command signal of LED 213 represented by curve 76 represents the light intensity of LED 213.

In the established idle mode, when signal 71 exceeds a threshold tension of about 0.9V, FET 211 is in on-state and the LED intensity increases during a period T3 then progressively decreases during a period T4 depending on the signal 71 intensity. Then, when signal 71 passes through the threshold tension, the LED turns off. This cycle is repeated at each period T in idle mode.

Thus, LED 213 blinks slowly with a period equal to about 5s and the terminal equipment 10 user perceives, in a very ergonomic manner, the idle mode.

According to a variant of the invention, in idle mode, the values of resistances 603 and 604, as well as the value of the capacitance of condenser 602 can be adjusted according to the desired increase or decrease times of the LED 213 intensity. If the resistance values are sufficiently high, LED 213 can remain lit continuously.

Figure 8:
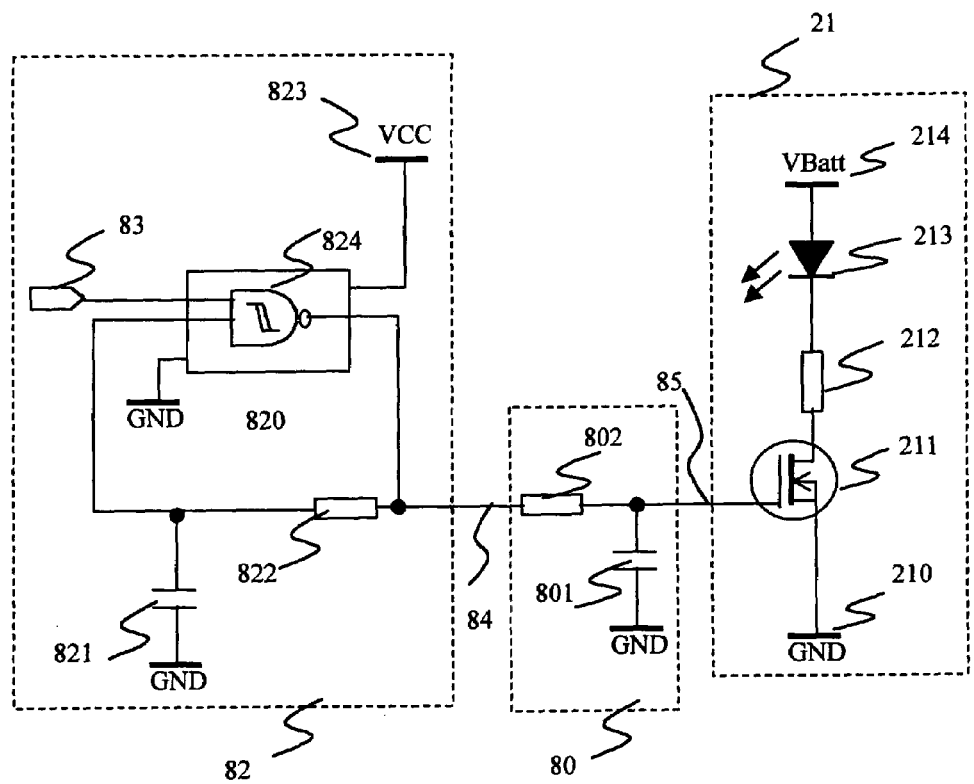

FIG. 8 presents an electronic diagram according to another variant of the invention implemented in terminal equipment 10.

The control circuit elements of diode 11 include, in particular:
an oscillator 82
an integrator 80
a unit 21 associated to a LED 213 similar to the unit that carries the same references as regards to FIG. 2 and will therefore not be described further.

Oscillator 82 accepts as input a command signal 83 (activation or trigger signal active at the high level) and presents an output signal 84. It includes, in particular:
- a NAND gate with two MC74VHC1C132-type inputs 824 powered by an adjusted VCC tension 823 of about 2.8V and the ground connection 820
- a 910 kΩ electrical resistance 84
- a 4.7 µF condenser 821

The first and second input terminals of component 824 are linked respectively to command signal 83 and a terminal of condenser 821 (the other terminal is the ground connection), itself linked to a first terminal of resistance 822.

The component 824 output is connected to a second terminal of resistance 822 and supplies a signal 84.

Integrator 80 accepts on input the command signal 84, presents at the output a signal 85 and includes:
- a 300 kΩ electrical resistance 802 linked to signals 84 and 85
- a 2.2 µF condenser 801 in which one of its terminals is linked to signal 85 and the other terminal is linked to the ground connection.

The transistor 211 field-effect gate is linked to signal 85.

Thus, oscillator 82 allows obtaining a periodic square wave signal 84 that consumes little energy and that is set by integrator 80 to allow a LED 213 intensity that varies slowly, which the user can easily associate with an idle mode and that consumes little energy.

The radio communications device illustrated in FIG. 8 allows obtaining signals that are similar to those described in FIG. 3 (signals 30, 31, and 32, which are respectively taken at points 43, 45, and at the terminals of LED 213).

Of course, the invention is not limited to the embodiment examples mentioned above.

In particular, those skilled in the art could provide any variant in the type of terminal equipment that has at least two operating modes (for example a "communication" mode or an idle mode) and that can be any type associated with a network and/or radio communications link. Other operating modes can be associated with various types of frequencies or luminosity of the source, for example, a mode associated with a type of communication (voice communication, data transmission) or a terminal equipment status (for example, battery charge, etc.) The invention is not limited to the light sources of the type that include one or several LEDs, but rather it is applicable to any type of source that can be used on a radio communications terminal equipment, and in particular, to a screen or part of a screen.

Those skilled in the art could also provide any variants in the integration means (for example, based on the use of capacitive circuits and/or active components), the oscillator, and the tension conversion means to a current that powers a light source. In particular, these various means can be implemented, according to the invention, in the form of discrete components and/or integrated circuits. The invention also relates to an integrated circuit that implements all or part of these means (in particular, integration means, oscillator, conversion means and light source).

The control signals are not limited to the embodiments described but extend, according to the invention, to all signals adapted to control a light source of a radio communications terminal, and including, in particular, a noticeably periodic digital signal that powers the integration means connected to said light source. According to the invention, this signal can be any signal (for example, square wave, triangular) to be adapted to the desired light effect.

Light emitting diodes (or LEDs) of various types are compatible with the invention. According to the invention, LEDs of different colours or LEDs that change colour according to the communication mode by controlling the amplitude of command signals can be notably implemented. The LED can, according the different variants of the invention, blink at different times, according to very diverse frequencies or rhythms and/or according to adapted intensity variations.

Furthermore, those skilled in the art could integrate in one or several integrated circuits (or electronic chips) the embodiments previously described in the form of discrete components.

Additionally, the invention relates to any type of radio communications device, in particular, mobile telecommunications terminals (for example, UMTS or GSM-type terminals,) wireless telephone terminals (in particular, DECT,) PDA (Personal Digital Assistant) type terminals, and also components (in particular, integrated circuits or electronic chips) or electronic cards designed to equip such terminal equipments.

What is claimed is:

1. A radio communications device comprising:
an integrator; and
at least one light source connected to the integrator, which indicates at least two distinct statuses of said device and whose luminosity varies according to different rhythms according to said statuses, wherein in at least a first of said statuses, said light source is controlled by a noticeably periodic digital signal that powers the integrator.

2. The radio communications device according to claim 1, wherein said first status is an idle status that requires low energy consumption.

3. The radio communications device according to claim 1, wherein said noticeably periodic digital signal is a square wave signal.

4. The radio communications device according to claim 3, wherein said digital signal changes value at each activation of an alarm associated with processing performed by the device during the idle mode.

5. The radio communications device according to claim 4, wherein said alarm is associated with a paging signal received by said device when it is in the idle mode.

6. The radio communications device according to claim 1, wherein said integrator includes at least one resistance and at least one capacitance forming the integrator.

7. The radio communications device according to claim 6, wherein said integrator includes two parallel-mounted circuits, each including at least one resistance and at least one diode, wherein said diodes are mounted in opposite direction in said circuits, and wherein said circuits and at least one capacitor form the integrator.

8. The radio communications device according to claim 1, wherein the period of said digital signal is greater than or equal to two seconds.

9. The radio communications device according to claim 1 and further comprising:
a voltage-to-current converter, which supplies current to the light source and is powered by the integrator.

10. The radio communications device according to claim 9, wherein the converter comprises a field-effect transistor and an associated resistance.

11. The radio communications device according to claim 1, wherein said light source includes at least one light emitting diode.

12. The radio communications device according to claim 1, wherein, in at least one second status, said source is controlled by a pulse width modulated signal.

13. The radio communications device according to claim 12, wherein said digital signal and said pulse width modulated signal are multiplexed over a single input.

14. The radio communications device according to claim 1, wherein in at least a second of said statuses the integrator is inactive and isolated from a ground connection in the device using a transistor.

15. The radio communications device according to claim 1, wherein the device includes at least two integrators that can be used selectively in order to modify the light variation rhythm.

16. The radio communications device according to claim 1, wherein the integrator comprises a programmable integrator that can be programmed to modify the light variation rhythm.

* * * * *